US 8,839,039 B2

(12) United States Patent
Garlick et al.

(10) Patent No.: US 8,839,039 B2
(45) Date of Patent: Sep. 16, 2014

(54) INITIALIZATION OF GPU USING ROM-BASED INITIALIZATION UNIT AND PROGRAMMABLE MICROCONTROLLER

(75) Inventors: Lincoln Garlick, Santa Clara, CA (US); Saket Jamkar, Santa Clara, CA (US); Steven Mueller, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 256 days.

(21) Appl. No.: 13/357,553

(22) Filed: Jan. 24, 2012

(65) Prior Publication Data

US 2013/0191692 A1 Jul. 25, 2013

(51) Int. Cl.
*G06F 11/00* (2006.01)

(52) U.S. Cl.
USPC .......................................................... 714/36

(58) Field of Classification Search
None
See application file for complete search history.

(56) References Cited

U.S. PATENT DOCUMENTS

| 5,507,026 | A  | * | 4/1996  | Fukushima et al. | 345/568 |
| 6,571,363 | B1 | * | 5/2003  | Steiss           | 714/732 |
| 6,681,282 | B1 | * | 1/2004  | Golden et al.    | 710/302 |
| 6,839,853 | B2 | * | 1/2005  | Odaohhara et al. | 713/300 |
| 6,981,176 | B2 | * | 12/2005 | Fruehling et al. | 714/11  |
| 2003/0233558 | A1 | * | 12/2003 | Lieberman et al. | 713/189 |
| 2011/0202154 | A1 | * | 8/2011  | Keller et al.    | 700/94  |
| 2011/0291748 | A1 | * | 12/2011 | Li et al.        | 327/544 |

\* cited by examiner

*Primary Examiner* — Nadeem Iqbal
(74) *Attorney, Agent, or Firm* — Patterson & Sheridan, LLP (57) ABSTRACT

An approach is disclosed for performing initialization operations for a graphics processing unit (GPU). The approach includes detecting errors while performing one or more initialization operations. Further, the approach includes releasing a holdoff on a communication link that couples the GPU to a memory bridge and causing debug output to be displayed to a user that indicates the error.

20 Claims, 5 Drawing Sheets

INITIALIZATION OF GPU USING ROM-BASED INITIALIZATION UNIT AND PROGRAMMABLE MICROCONTROLLER

BACKGROUND OF THE INVENTION

1. Field of the Invention

Embodiments of the present invention relate generally to initialization and, more specifically, to initializing a graphics processing unit (GPU) using a ROM-based initialization unit and a programmable microcontroller.

2. Description of the Related Art

Certain advanced computer systems augment the processing capabilities of a general purpose CPU with a specialty processor, such as a graphics processing unit (GPU). Typically, in such architectures, the GPU is initialized to configure the GPU in a predefined way before a communication link, such as a Peripheral Component Interconnect Express (PCIe®) link, is established. One conventional way to initialize the GPU is by reading instructions from a read-only memory (ROM) external to the GPU and performing write operations to registers within the GPU according to those instructions. Specifically, an initialize-from-ROM component (IFR), triggered to execute at a predefined time after reset, performs the register write operations after determining that the ROM exists. When the IFR finishes writing to the registers, the IFR releases a holdoff on the communication link, allowing communication to occur. For PCIe devices, releasing the holdoff allows LTSSM link training to begin and typically only occurs after the IFR finishes its register write operations so as to ensuring that these writes cannot be interfered with by other programs or processes within the broader system.

Such a conventional approach, in which link training begins only after all register write operations are complete, is not robust against errors and cannot be debugged. In particular, because PCI link training begins only after the register writes have been completed, any error preventing the write operations from completing cannot be identified. Further, because the IFR only reads from the ROM and writes to the registers, individual register addresses have to be coded within the ROM, thereby necessitating a large ROM. In addition, the IFR is typically not able to provide additional functionality such as read-modify-write operations, polling operations, branching, and time delays, that could be useful for the initialization and debugging of the GPU.

As the foregoing illustrates, what is needed in the art is a more effective way to initialize a GPU that addresses one or more of the drawbacks discussed above.

SUMMARY OF THE INVENTION

One embodiment of the invention sets forth an approach for performing initialization operations for a graphics processing unit (GPU). The approach includes detecting an error while performing one or more initialization operations. In addition, the approach includes releasing the holdoff on a communication link that couples the GPU to a memory and thereby allowing the error to be debugged via software once the system boots, or even causing debug output to be displayed to a user that indicates the error. In one embodiment, the approach further includes programming a microcontroller to perform at least one of the one or more initialization operations.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

System Overview

Figure 1:
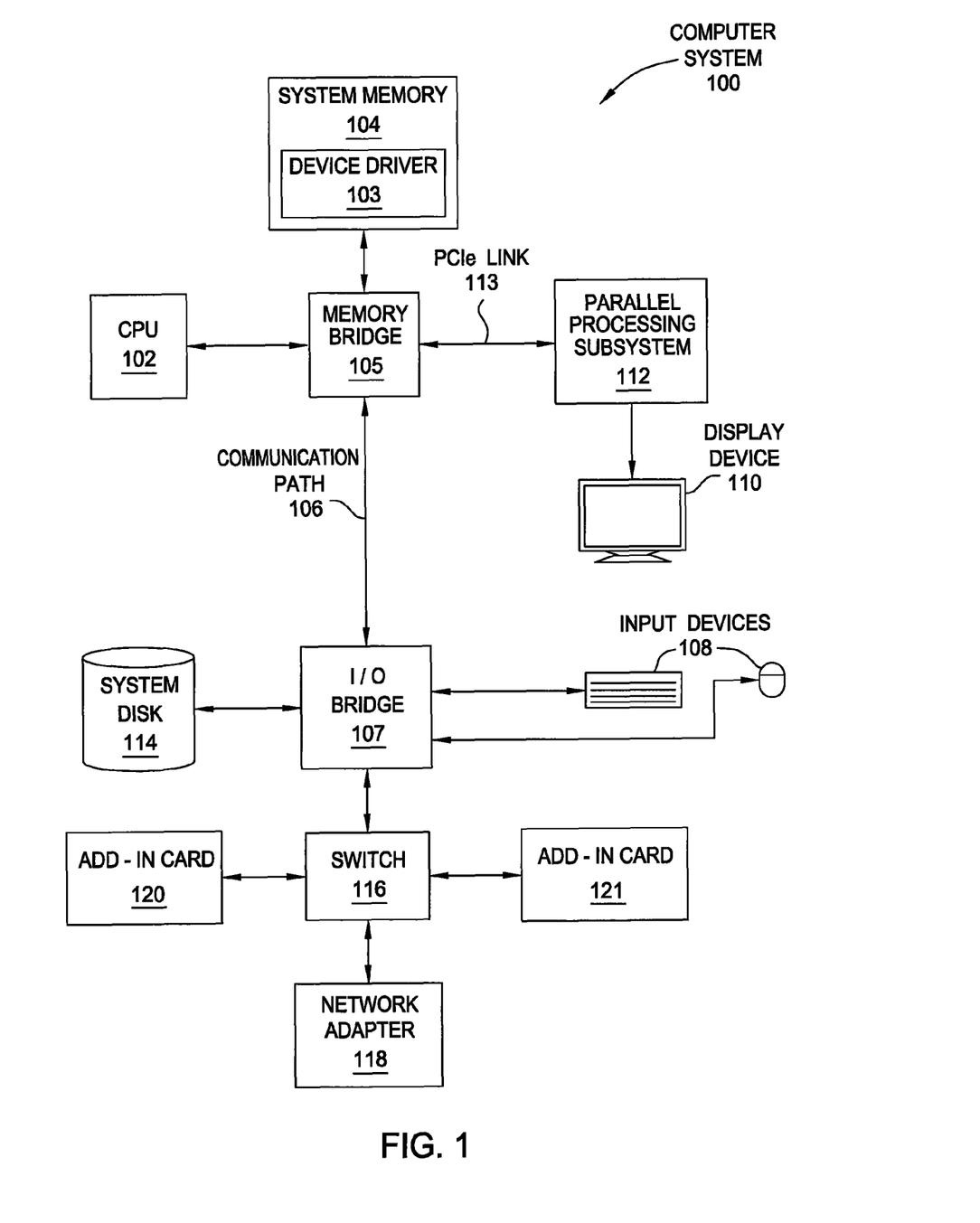
FIG. 1 illustrates a computer system configured to implement one or more aspects of the present invention.

FIG. 1 illustrates a computer system configured to implement one or more aspects of the present invention. As shown, computer system 100 includes a central processing unit (CPU) 102 and a system memory 104 communicating via an interconnection path that may include a memory bridge 105. Memory bridge 105, which may be, for example, a Northbridge chip, is connected via a bus or other communication path 106 (e.g., a HyperTransport link) to an I/O (input/output) bridge 107. I/O bridge 107, which may be, for example, a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a communication link, illustrated as a Peripheral Component Interconnect Express (PCIe) link 113. In one embodiment, parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture described herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 may be integrated into a single chip. Large embodiments may include two or more CPUs 102 and two or more parallel processing systems 112. The particular components shown herein are optional; for instance, any number of add-in cards or peripheral devices may be supported. In some embodiments, switch 116 is eliminated, and network adapter 118 and add-in cards 120, 121 connect directly to I/O bridge 107.

Figure 2:
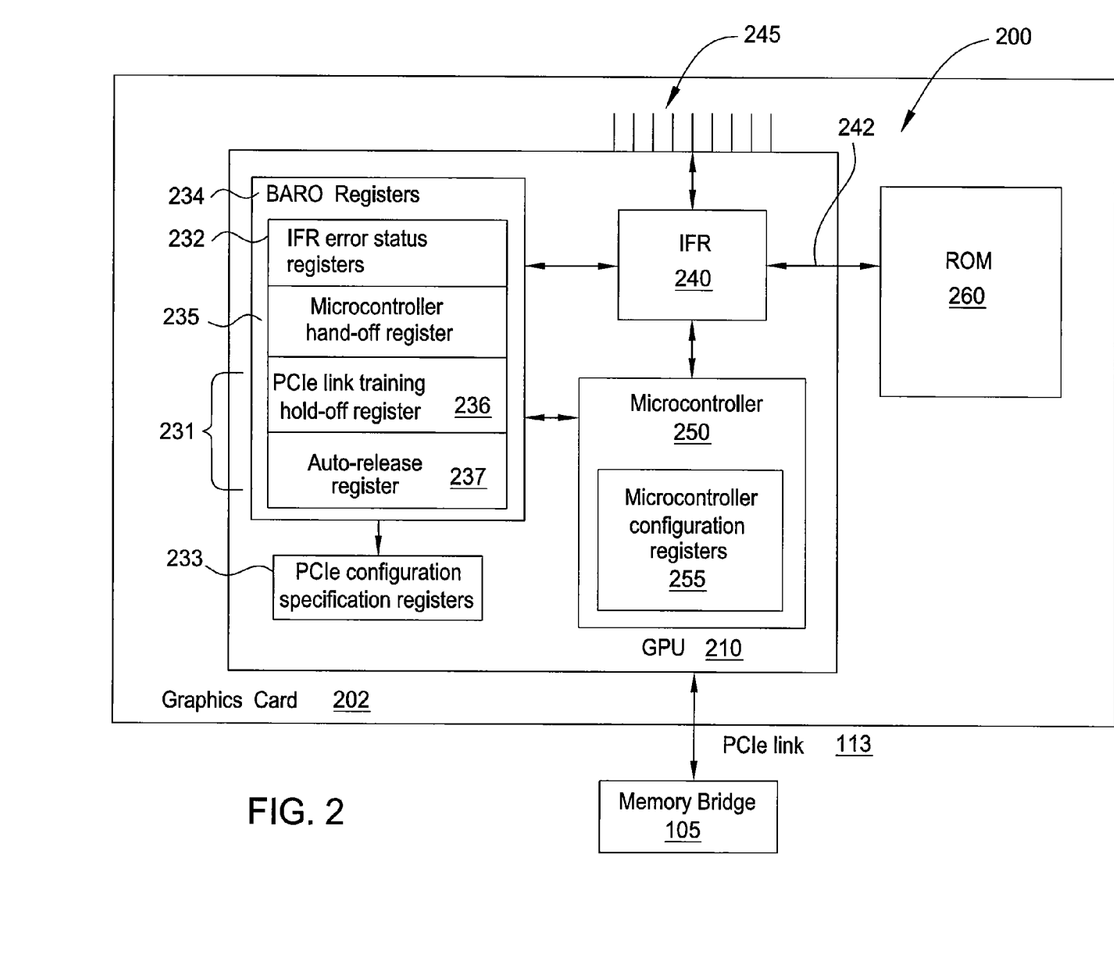
FIG. 2 illustrates a subsystem configured to perform GPU initialization, according to one of embodiment of the present invention.

FIG. 2 illustrates a subsystem 200 configured to perform GPU initialization, according to one embodiment of the present invention. As shown, the subsystem 200 resides on a graphics card 202 and includes, without limitation, a GPU 200 coupled to a memory bridge 105 via a PCIe link 113, and a ROM 260.

The GPU 210 includes straps 245, an initialization-from-ROM element ("IFR") 240, a microcontroller 250, and PCIe base address register #0 ("BAR0") registers 234. The straps 245 may protrude from the GPU 210 and may include settings that can be read to ascertain information about the GPU 210, the Graphics Card 202, and/or the subsystem 200. In particular, the straps 245 may be read by the IFR 240 to determine whether the ROM 260 is present within the subsystem 200. In some embodiments, IFR 240 may do nothing beyond its initial reads of straps 245 and automatically release the hold-off on the PCIe link 113 when the straps 245 indicate that a ROM 260 is not present within the subsystem 200, thereby supporting system configurations where no ROM is attached without requiring a separate hardware implementation of the IFR.

The IFR 240 is communicatively coupled with the ROM 260 via, for example, a bus 242. The IFR 240 is further communicatively coupled to the BAR0 registers 234. The IFR 240 is configured to read from the straps 245 at a predefined time after reset in order to determine whether a ROM 260 is present. Upon determining that a ROM 260 is present, the IFR 240 reads addresses and data from the ROM 260 and performs write and/or read-modify-write operations to the BAR0 registers 234 based on those instructions. Further, the IFR 240 may be configured to program the microcontroller 250, including via writing to one or more of the BAR0 registers 234 that indirect to microcontroller configuration registers 255, to perform advanced initialization sequences such as polling operations, branching, delays, and repeated accesses to a resource. One or more of these advanced initialization sequences may involve operations the IFR 240 cannot perform itself because the IFR 240 is only capable of predesigned operations across a limited set of interfaces. In contrast, the microcontroller, which may be a generic microcontroller offering a general instruction set like a CPU and having a more complete set of interfaces with the system, is capable of performing operations not conceived before hardware fabrication time. After programming the microcontroller 250, the IFR 240 may be directed to kick off execution of the operation via an instruction in the ROM 260 that causes, without limitation, the Microcontroller hand-off register 235 to be written.

In one embodiment, the IFR 240 is configured to automatically release the link-training holdoff on PCIe link 113 when the IFR 240 completes initialization steps. In an alternative embodiment, the IFR 240 may be configured to hand off to the microcontroller 250 the function of releasing PCIe link 113. For example, a register in the BAR0 registers 234 may be used to store information regarding whether the IFR 240 releases the PCIe link 113 holdoff or requires the microcontroller 250 to release the holdoff. In one embodiment, link holdoff release itself is implemented using IFR control registers 231, and, specifically, a PCIe link training hold-off register 236, which initiates link training when written to a specific value, and an auto-release register 237, which indicates whether termination of the IFR 240 automatically releases the PCIe link 113. Handing off the release of the PCIe link 113 to the microcontroller 250 includes disabling the auto-release register 237 and leaving the value of the hold-off register 236 in place for the microcontroller 250 to modify, thereby delaying link release until the microcontroller modifies the value of the microcontroller hold-off register 236, for example, after reading the value of the auto-release register 237 to determine that IFR instructions encoded in the ROM 260 were written with the intent for the microcontroller 250 to perform the release.

The microcontroller 250 is capable of reading from and writing to any location on the GPU 210. Further, the microcontroller 250 includes microcontroller configuration registers 255 that the IFR 240 may access to program microcontroller 250. In some embodiments, the IFR 240 is configured to perform one or more of a read-modify-write operation, repeated write operations to the same address, and/or write operations to incrementing addresses, in order to facilitate programming of the microcontroller 250. In a further embodiment, the register addresses for repeated write operations to the same address and/or write operations to incrementing addresses are not individually coded in the ROM 260.

In one embodiment, microcontroller 250 executes program instructions in the microcontroller configuration registers 255 after the IFR 240 has finished performing initialization operations. In an alternative embodiment, the microcontroller 250 may begin executing program instructions in microcontroller configuration registers 255 while the IFR 240 is performing initialization operations. That is, the microcontroller 250 and the IFR 240 may perform initialization operations simultaneously.

The BAR0 registers 234 include IFR error status registers 232, registers for indirect access to the PCIe configuration specification registers 233, IFR configuration registers 231, microcontroller hand-off registers 235, and, in some embodiments, indirection registers for access to the ROM 260. As described above, the IFR error status registers 232 store information regarding errors encountered during the initialization process. For example, the IFR error status registers 232 may store bits indicating a failed parity check for an instruction, an incorrect ROM 260 size, or a catch-all for other easily-detectable ROM 260 formatting errors. The information stored in the IFR error status registers 232 can later be retrieved via the Graphics Card 202 device driver for error handling, queried by an engineer via a debugger through the PCIe BAR0 address space for the Graphics Card 202, and/or displayed as debug output.

The PCIe configuration specification registers 233 provide a configuration space for the GPU 210. The PCIe configuration specification registers 233 include, without limitation, the physical address offset at which BAR0 addresses stored within the register 234 may be accessed as part of the system's memory subsystem. In general, BAR0 addresses may hold memory addresses used by the GPU 210 or offsets for port addresses. To initialize the GPU 210, the IFR 240 may, among other things, access BAR0 addresses within the GPU 210 accessible via the memory offset given by BAR0 via a separate interface than the virtual memory BAR0 offset and perform register operations.

The IFR configuration registers 231 include, without limitation, a PCIe link training hold-off value 236 and an auto-release value 237. The PCIe link training hold-off value 236 initiates link training when written to a specific value, and the auto-release value 237 indicates whether the act of terminating the IFR 240 automatically releases the holdoff on the PCIe link 113. As described above, the link holdoff release operation may be handed off to the microcontroller 250. In such cases, the IFR 240 disables the auto-release value 237 and leaves the value of the hold-off register 236 in place for the microcontroller 250 to modify, thereby delaying link holdoff release until the microcontroller 250 is ready for link training and PCIe device enumeration of the Graphics Card 202 to occur. Further, the IFR 240 may automatically terminate and release the holdoff on the PCIe link 113 when the IFR 240 encounters an error, regardless of whether the auto-release register is set to release the holdoff or not. The IFR 240 performs this type of release by setting the value of the PCIe link training hold-off value 236 to "disabled," thereby releasing the holdoff of PCIe link 113 and forcing link training to begin.

The PCIe link training hold-off auto-release register 237 can be used to determine whether the PCIe link holdoff release is handed off to the microcontroller 250. As described above, the IFR 240 may automatically release the holdoff on the PCIe link 113 when the IFR 240 completes initialization. Alternatively, however, the IFR 240 may hand off the link release to the microcontroller 250 instead. The ROM 260 may indicate whether such a hand off should take place by including instructions for the IFR 240 to disable auto-release by writing to the auto-release register 237, program the microcontroller, and kick off execution of the microcontroller by writing the microcontroller hand-off register 235, thereby enabling or disabling hand off of PCIe link release to the microcontroller 250.

The ROM 260 may include a fixed function section 310 that allows the IFR 240 to validate whether the ROM 260 is corrupt or not, as well as certain additional security features. Validation and security techniques that may be included within the fixed function section 310 include, without limitation, a total-ROM-size value, a checksum value, and a pre-defined sequence of 1 s and/or 0 s. These techniques as well as other aspects of the ROM 260 are described in greater detail below with respect to FIG. 3. The ROM 260 may further include an extended section 319 that contains information about register operations to be performed during initialization. In some embodiments, the register operations include writing to BAR0 registers 234, as well as doing read-modify-write operations to those registers. The extended section 319 of the ROM 260 may further include instructions for programming the microcontroller 250, which may also be performed exclusively via writes to various BAR0 registers 234 in some embodiments, to perform advanced initialization sequences, as well as bits used to indicate whether data in the extended section itself is corrupt or otherwise incorrect. In various embodiments, errors in the extended section as well as other errors encountered during the initialization process (e.g., an error caused by a bug in the IFR 240) may automatically trigger release of PCIe link 113 by the IFR 240. In such instances, the IFR 240 may cause information useful for debugging that is available across PCIe link 113, and can be displayed to a user via the display device 110. Such information may be stored in and retrieved from IFR error status registers 232.

Figure 3:
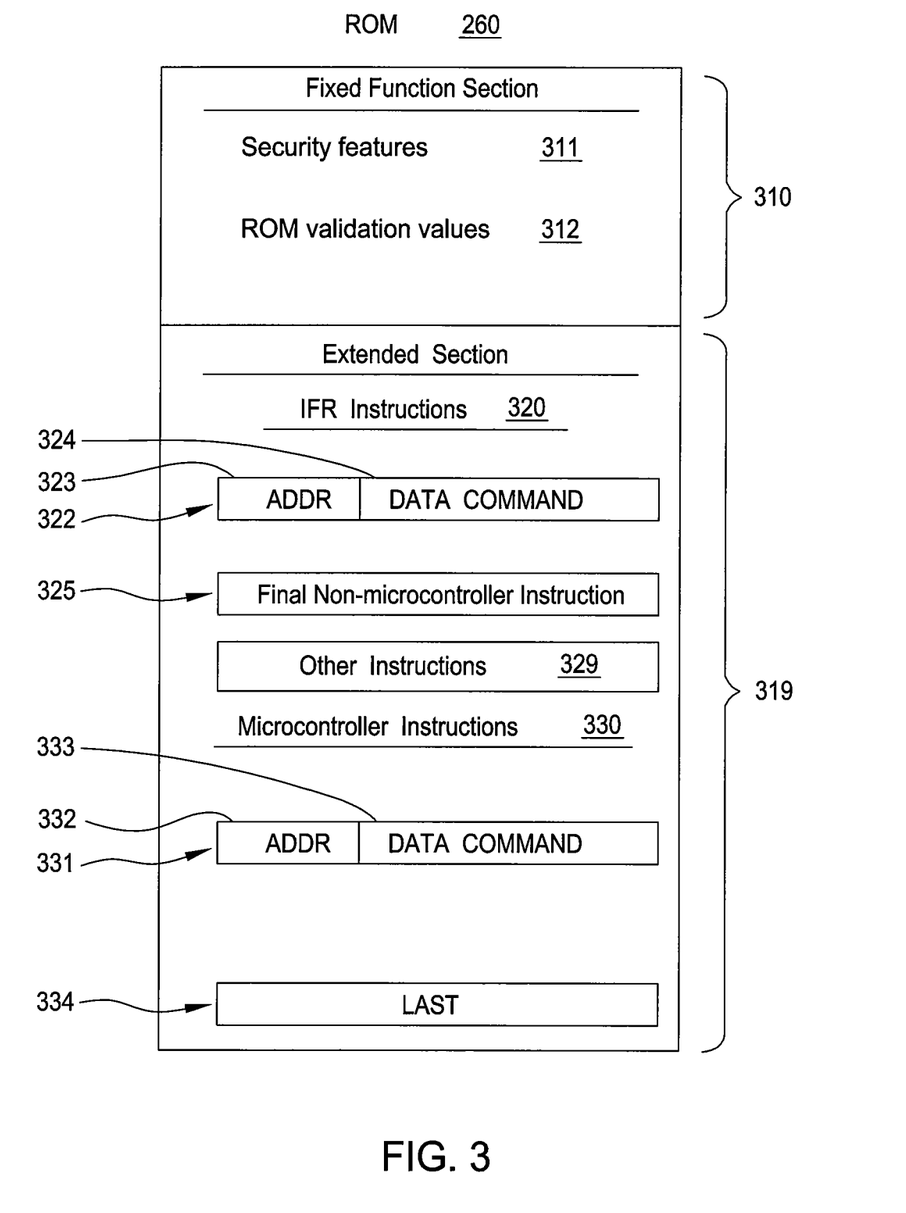
FIG. 3 is a more detailed illustration of the ROM of FIG. 2, according to one embodiment of the present invention

FIG. 3 is a more detailed illustration of the ROM 260 of FIG. 2, according to one embodiment of the present invention. As shown, the ROM 260 includes a fixed function section 310 and an extended section 319. The fixed function section includes security features 311 and ROM validation values 312. Security features 311 may include a signature word and/or specific expected sequences of 1 s and/or 0 s. ROM validation values may include a total-ROM-size value indicating the total size of the ROM 260 in bytes and/or a checksum value used to determine whether the actual sum of a total-ROM-size number of bytes in the ROM, masked off by a predefined parity, equals the checksum value.

In general, after identifying the presence of ROM 260, the IFR 240 begins reading the fixed function section 310. In particular, the IFR 240 first reads and verifies the security features 311. If the ROM 260 is corrupt or counterfeit, the security features verification may fail. In such cases, the IFR 240 may terminate, release the holdoff on PCIe link 113, and cause appropriate debug output to be displayed to the user. If the security features 311 are verified, then the IFR 240 continues reading the fixed function section 310. In particular, the IFR 240 retrieves from the fixed function section 310 the validation values 312. These values may be used, in combination with the absence or early presence of the LAST instruction 334, to determine whether, for example, the actual total ROM size matches an expected size. A mismatch could indicate a corrupt or counterfeit ROM 260, and also cause the IFR 240 to terminate, release the PCIe link 113 holdoff, and cause appropriate debug output to be displayed to the user.

The extended section 319 includes several different types of data. As shown, the data includes IFR instruction set 320, microcontroller instruction set 330, and other instructions 329. The IFR instruction set 320 includes instructions for the operations the IFR 240 performs during initialization. Within the IFR instruction set, each IFR instruction 322 includes an address ("ADDR") 323 and data ("DATA COMMAND") 324. The address 323 specifies a register address (e.g., a BAR0 address), and the data 324 indicates a register write operation to be performed by the IFR 240 to the address 323. In some embodiments, the data 324 includes dwords, and each IFR instruction 322 includes embedded values for validating the instruction 322. For example, the data may 324 include a parity bit associated with each instruction, and the IFR 240 may be configured, for example by default, to determine whether a parity of the instruction matches the parity bit for the instruction. The parity bit may specify an even or odd parity and may be used by the IFR 240 to determine whether the actual number of bits with value one in the instruction 322 being even or odd indicates a parity failure. A mismatch could indicate a corrupt or counterfeit ROM 260. Such per-instruction parity checks can be used by the IFR 240 to detect errors and terminate as early as possible to maximally limit the extent of corruption of memory/register space. Finally, in some embodiments, a "final non-microcontroller-programming" instruction 325 signifies the end of the IFR instruction set 320.

The microcontroller instruction set 330 includes instructions for the operations that the IFR 240 performs to program the microcontroller 250. Within the microcontroller instruction set 330, each microcontroller instruction 331 includes an address ("ADDR") 332 and data ("DATA COMMAND")

333. The address 332 specifies a register address within the microcontroller configuration registers 255, and the data 333 indicates a write operation to be performed by the IFR 240 to the address 332. For example, microcontroller instruction 331 may specify that the IFR 240 programs the microcontroller 250, by writing the appropriate raw machine code targeting the microcontroller, to perform one or more polling operations, operations requiring branching, operations requiring delays, and operations requiring repeated accesses to a resource. In some embodiments, each microcontroller instruction 331 may include a parity bit. In such an embodiment, the IFR 240 may be configured to determine whether the parity of the instruction matches the parity bit for the instruction. A mismatch could indicate a corrupt or counterfeit ROM 260. An alternate embodiment may not distinguish between the instruction sets 320, 329, and 330. For example, the IFR 240 may program the microcontroller 250 via registers within the BAR0 addresses register space that indirect to the microcontroller configuration registers 255, allowing the microcontroller to be programmed via the IFR instructions 320. Finally, in some embodiments, a "last" instruction 334 signifies the end of all IFR instructions 319, and demarks the end of the ROM 260 image that will be read by the IFR 240.

GPU Initialization

An improved IFR 240 and an improved instruction set for encoding the ROM 260 as described allow for release of the holdoff on PCIe link 113 upon error, faster boot-ups, and a more compact ROM 260. The ROM 260 includes a fixed function section 310 and an extended section 319. The fixed function section 310 includes information that allows the IFR 240 to determine whether the ROM 260 is corrupt or counterfeit, and to protect the GPU 210 from unauthorized access. The extended section 319 of the ROM 260 includes information on register operations to be performed by the IFR 240, which may act in concert with a microcontroller 250. Release of the holdoff on PCIe link 113 is triggered when the IFR 240 encounters a ROM error or some other error while the IFR 240 is performing initialization operations. Advanced initialization sequences, such as polling operations, operations involving branching, operations involving delays, and operations involving repeated accesses to a resource are performed by the microcontroller 250 rather than the IFR 240. In particular, the ROM 260 may include an improved instruction set, and the IFR 240 may use the improved instruction set to program the microcontroller 250 to perform advanced initialization sequences.

Figure 4:
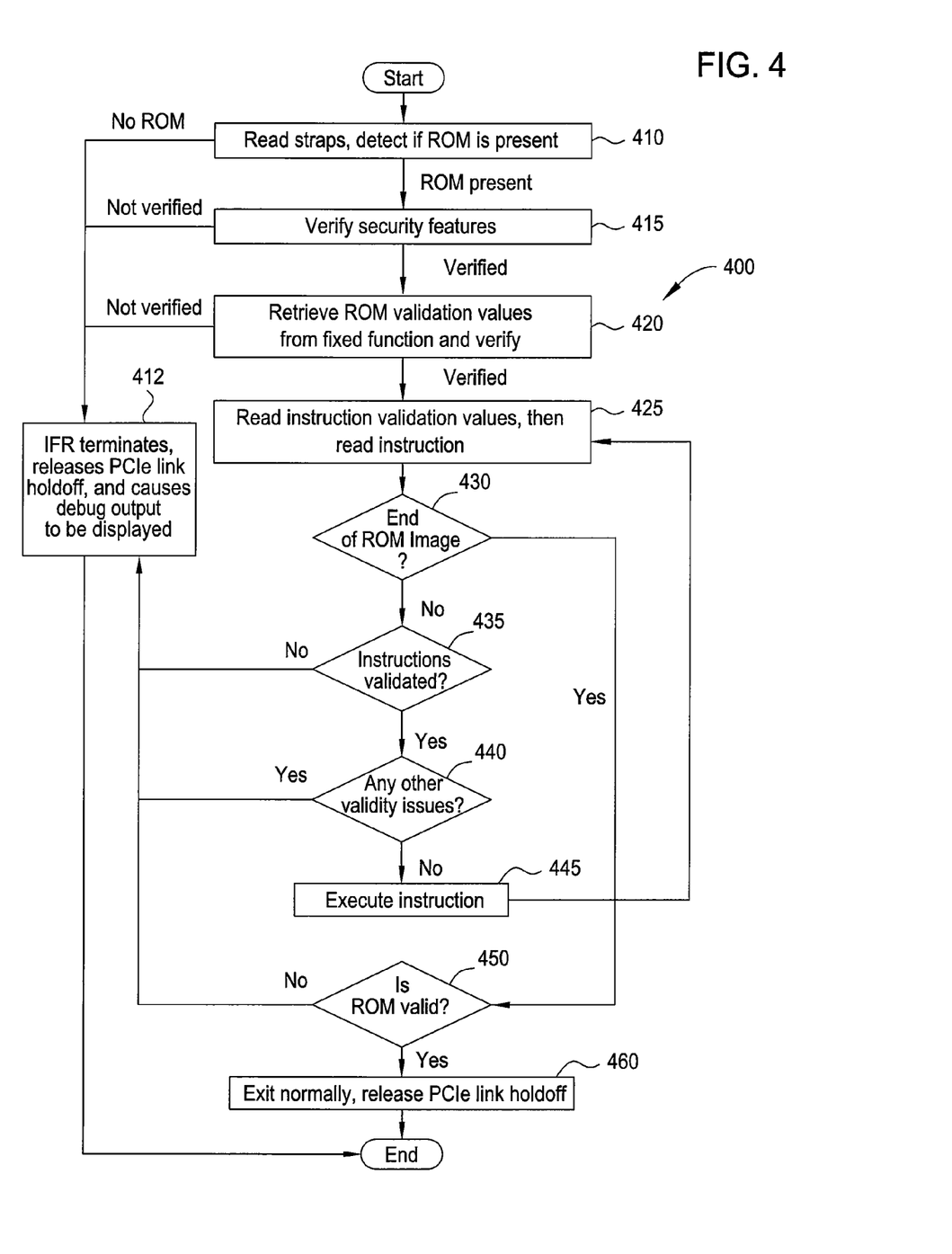
FIG. 4 is a flow diagram of method steps for performing initializing via an IFR component and releasing a PCIe link upon the occurrence of an error, according to one embodiment of the present invention.

FIG. 4 is a flow diagram of method steps for performing initializing via an IFR component and releasing a PCIe link upon the occurrence of an error, according to one embodiment of the present invention. Although the method steps are described in conjunction with FIGS. 1-3, persons skilled in the art will understand that any system configured to perform the method steps, in any order, falls within the scope of the present invention.

The method 400 begins at step 410, where the IFR 240 reads the straps 245 to determine whether a ROM 260 is present within the system 200. If a ROM 260 is not present, then the IFR 240 terminates operation, releases the holdoff on PCIe link 113, and optionally causes appropriate debug output (e.g., indicating that the ROM is not present) to be displayed to the user at step 412. Regardless of whether the ROM is present, an embodiment may also perform other fixed function initialization of the Graphics Card 202 prior to releasing the holdoff on link training and terminating.

If, at step 410, the IFR 240 detects that the ROM 260 is present, then, at step 415, the IFR 240 begins reading the fixed function section 310 of the ROM 260 to verify security features 311. For example, the IFR 240 may verify that a specific sequence of 1 s and/or 0 s is present at a particular location in the fixed function section 310. Failure to verify the security features 311 may indicate that the ROM 260 is corrupt or counterfeit, causing the IFR 240 to terminate operation, release the PCIe link 113, and cause appropriate debug output to be displayed to the user at step 412.

If, at step 415, the IFR 240 successfully verifies the security features 311, then, at step 420, the IFR 240 reads one or more ROM validation values 312 from the fixed function section 310 of the ROM 260. For example the IFR 240 may read from the fixed function section 310 a total-ROM-size value and a checksum value. The total-ROM-size value may indicate the total size of the ROM 260 in bytes and may be used to ascertain whether the actual size of the ROM 260 matches the total-ROM-size value. The checksum value may indicate an expected sum of a total-ROM-size number of bytes in the ROM 260, masked off by a predefined parity, and may be used to ascertain whether an actual checksum value of the ROM 260 equals the value of the checksum value. Failure of the total-ROM-size value or checksum value in the fixed function section 310 to match their respective actual values may indicate that the ROM 260 is corrupt or counterfeit, causing the IFR 240 to terminate at step 412 as described above. One or more validation values may be verified at step 420 before the method 400 proceeds further. One embodiment is not limited to performing the individual steps within the security and validation features of 311 and 312 in any particular order and may interleave them.

After the IFR 240 finishes reading from the fixed function section 310, the IFR 240 begins reading data from the extended section 319 of the ROM 260. At step 425, the IFR 240 reads validation values associated with an instruction of the extended section 319, and the IFR 240 then reads the actual dwords of the instruction, without limitation as part of the same read operation. In one embodiment, a parity bit may be associated with the instruction, and, in such a case, the IFR 420 may read the parity bit and determine whether the value of the parity bit matches the actual parity of the bits composing the instruction. In a further embodiment, the IFR 420 determine whether bits within the instruction match predefined values for those bits.

At step 430, the IFR 240 determines whether the end of the ROM 260 image has been reached. In one embodiment, this determination is based on whether a "last" instruction is read at step 425. More specifically, a predefined type of instruction, which may occur at a predefined ROM location (e.g., a read-modify-write instruction occurring at a certain address), may serve as the last instruction, which may itself encode an additional write or read-modify-write operation. Assuming the end of the ROM 260 image has not been reached, or if the instruction is a last write, the IFR 240 validates the instruction read at step 435. For example, the IFR 240 may compare the parity value read at step 420 with the actual parity of the instruction. If the instruction validation fails, then the ROM 260 may be corrupt or counterfeit. In such a case, the IFR 240 terminates, releases the PCIe link 113 holdoff, and causes appropriate debug output to be displayed to the user at step 412.

At step 440, the IFR 240 determines whether any other validation issues are encountered. For example, the IFR 240 may determine whether the arithmetic sum of the number of bytes of the instructions read so far composing the extended section 319 and the number of bytes of the fixed function section 310 that the IFR 240 has thus far read exceeds a total-ROM-size value, or that this sum plus the number of bytes required for a last instruction 334 would exceed the total-ROM-size value. Exceeding the total-ROM-size value may indicate that the ROM 260 is corrupt or counterfeit, given that the last instruction 334 has not yet been reached. Again, if other validation issues are encountered, then the IFR 240 terminates, releases the PCIe link 113, and displays appropriate debug output to the user at step 412. If the IFR 240 determines at steps 430, 435, and 440, respectively, that the end of the ROM 260 image has not been reached (in an embodiment where the last instruction 334 does not encode a write or read-modify-write operation), the instruction read is valid, and there are no other validation issues, then, at step 445, the IFR 240 executes the instruction, and the method 400 returns to step 425, where the IFR 240 reads another instruction.

Referring back now to step 430, if the IFR 240 determines that the end of the ROM 260 image has been reached and the embodiment is such that the last instruction 334 does not encode an additional operation, then the method advances to step 450, where the IFR 240 validates the ROM that has been read. In an alternative embodiment in which the last instruction does encode an operation, the IFR 240 performs that operation, and then the method advances to step 450. In particular, the IFR 240 may determine whether one or more of the validation values retrieved at step 420 match values determined from the actual ROM. For example, the IFR 240 may determine whether the actual total length of the ROM value matches a predefined total-ROM-size validation value read from the fixed function section 310, or the IFR may validate a checksum specified within the fixed function section. If the ROM 260 is not validated, then the IFR 240 terminates at step 412, releases the holdoff on PCIe link 113, and causes appropriate debug output to be displayed to the user (e.g., including indicating that the IFR 240 has completely processed the ROM).

Alternatively, if ROM 260 is validated, then the IFR 240 may exit normally and release the PCIe link 113 holdoff at step 460.

In one embodiment, link release is implemented using IFR 240 control registers 231. Specifically, writing a "disabled" value to a PCIe link training hold-off register 236 indicates that link training should commence, and the value of auto-release register 237 determines whether termination of the IFR 240 automatically releases the PCIe link 113. In such a case, if the IFR 240 encounters an error and terminates, then the error also causes the IFR 240 to unconditionally force the PCIe link training hold-off value 236 to "disabled." That is, link training is forced to occur when an error is encountered regardless of whether auto-release is enabled. Such an approach ensures that, even when auto-release is disabled (e.g., when link release would, in the absence of the failure condition, be handed off to the microcontroller 250), the IFR 240 triggers link training holdoff release and optionally causes appropriate debug output to be displayed to the user whenever the IFR 240 encounters an error.

Figure 5:
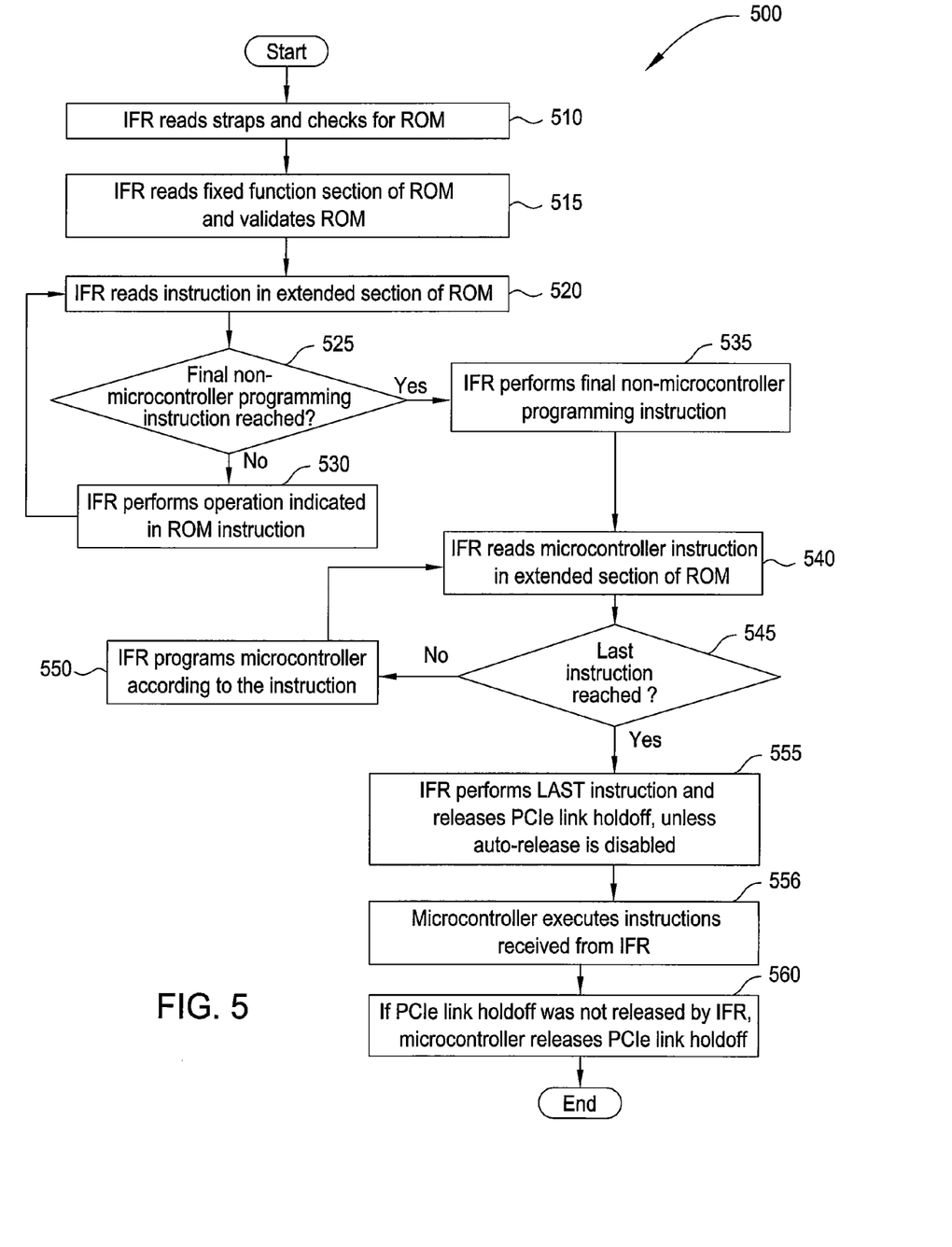
FIG. 5 is a flow diagram of method steps for configuring a GPU upon reset, according to one embodiment of the present invention.

FIG. 5 is a flow diagram of method steps for configuring a GPU 210 upon reset, according to an embodiment of the present disclosure. Although the method steps are described in conjunction with FIGS. 1-3, persons skilled in the art will understand that any system configured to perform the method steps, in any order, falls within the scope of the present invention.

The method 500 begins at step 510, where the IFR 240 reads the straps 245 to determine whether a ROM 260 is present in the system 200. In one embodiment, if the IFR 240 determines at step 510 that no ROM 260 is present, then the IFR 240 may terminate, release the PCIe link 113 holdoff, and cause appropriate debug output (e.g., indicating that no ROM is present) to be displayed, similar to steps 410 and 412 of FIG. 4.

Assuming, at step 510, the IFR 240 detects that the ROM 260 is present, then, at step 520, the IFR 240 verifies security features 311 and validation values 312 in the fixed function section 310. For example, the IFR 240 may verify that a specific sequence of 1 s and/or 0 s is present at a particular location in the fixed function 310, similar to step 415 of FIG. 4. In some embodiments, failure to verify the features of 311 and/or 312 may be treated as an error, and the IFR 240 may terminate, release the PCIe link 113 holdoff, and cause debug output to be displayed to the user, similar to step 412 of FIG. 4.

If the IFR 240 successfully verifies the security and/or validation features 311/312 at step 515, then, at step 520, the IFR 240 reads an instruction in the extended section 319 of the ROM 260. In some embodiments, the extended section 319 of the ROM 260 includes instructions indicating register operations that need to be performed to initialize the GPU 210 or Graphics Card 202, including register operations to be performed on the registers referred to by BAR0 addresses. In one embodiment, the IFR 240 may be configured further to detect an error, similar to steps 435 and 440 of FIG. 4. In such a case, the IFR 240 may, upon detecting the error, terminate, release the PCIe link 113 holdoff, and cause appropriate debug output to be displayed, similar to step 412 of FIG. 4.

At step 525, in one embodiment, the IFR 240 determines whether the final non-microcode-programming instruction 325 of register operations for the IFR 240 to execute has been reached. In a further embodiment, the final non-microcode-programming instruction 325 may be indicated by a predefined instruction occurring at a predefined address of the extended section 319 of the ROM 260. If the final non-microcode-programming instruction 325 has not been reached, then the IFR 240 performs the register operation or operations specified in the instruction read at step 515, and the method returns to step 520.

If, at step 525, the IFR determines that the instruction 322 read at step 520 is the final non-microcode-programming instruction 325 of register operations for the IFR to execute that don't involve programming the microcontroller, the IFR performs the operation indicated in the final non-microcode-programming instruction 325. In one embodiment, the final non-microcode-programming instruction 325 may be any normal IFR instruction 324.

At step 540, the IFR 240 continues reading instructions in the extended section 319 of the ROM 260 and, in particular, instructions from the set of microcontroller instructions 331, which specify register operations to be performed by the IFR 240 to program the microcontroller 250 to perform complicated initialization sequences. The IFR 240 instructions used may, in one embodiment, be of the same instruction set 322, and the microcontroller may then be programmed via indirect registers in the BAR0 address space mapping to the microcontroller configuration registers 255. The data written to the microcontroller configuration registers would, in such an embodiment, be a sequence of writes encoding the microcode 250 machine instructions performing the extended initialization. Such complicated initialization sequences may include, without limitation, polling operations, operations involving branching, operations involving delays, and operations involving repeated accesses to a resource.

At step 545, the IFR 240 determines whether the microcontroller instruction 331 read at step 540 is the last instruction 334 of extended section 319. In one embodiment, the IFR 240 may further be configured to detect an error, similar to steps 435 and 440 of FIG. 4, described above. In such a case, the IFR 240 may, upon detecting the error, terminate, release the holdoff of PCIe link 113, and display appropriate debug output, similar to step 412 of FIG. 4.

If the IFR 240 determines that the microcontroller instruction read at step 540 is not the last instruction 334, then, at step 550, the IFR 240 programs the microcontroller 250 according to the instruction by, for example, writing to BAR0 registers 234. The method 500 returns to step 540, where the IFR 240 reads another microcontroller instruction in the extended section 319 of the ROM 260. In one embodiment, the IFR 240 programs the microcontroller 250 by writing to the microcontroller configuration registers 255. In some embodiments, the IFR 240 is configured to perform one or more of a read-modify-write operation, repeated write operations to the same address, and/or write operations to incrementing addresses, in order to facilitate programming of the microcontroller 250. In a further embodiment, the register addresses for repeated write operations to the same address and/or write operations to incrementing addresses are not individually coded in the ROM 260—the start address of a series of repeated writes may be coded explicitly, for example, and the remainder of the addresses calculated automatically by the IFR 240 as further data words are read from the ROM.

Referring now to step 545, if the IFR 240 determines that the last instruction 334 of the extended section 319 has been read, then the IFR 240 executes the last instruction 334 at step 545. Then, the IFR 240 releases the PCIe link 113 holdoff, unless PCIe link holdoff release has been specified in the ROM 260 as a function that is handed off to the microcontroller 250. In one embodiment, the PCIe link release is implemented using IFR control registers 231, and, specifically, the PCIe link training hold-off register 236, which indicates whether link training should continue to be delayed, and the auto-release register 237, which indicates whether termination of the IFR 240 automatically releases the holdoff of PCIe link 113. In such a case, handing off PCIe link release to the microcontroller 250 includes disabling the auto-release register 237 and leaving the hold-off register 236 in place for the microcontroller 250 to modify, thereby delaying link release until the microcontroller 240 modifies the hold-off register 236. Further, in such a case, the process of disabling the auto-release register 237 and leaving the hold-off register 236 in place may be controlled by an additional bit in the microcontroller hand-off register 235 that indicates whether link release is handed off to the microcontroller. That is, at step 530, the IFR 240 may modify the value of the microcontroller hand-off register 235 according to an instruction read from the ROM 260 that indicates whether link release is handed off to the microcontroller 250, and the IFR may do this while or by means of executing a last instruction that initiates the kickoff of the microcontroller 250 by writing to register 235.

Generally, after the IFR 240 performs the last instruction (and in some cases, also releases the PCIe link 113 holdoff) at step 555, the IFR 240 terminates operation. Before, after, or at the same time that the IFR 240 terminates operation, the microcontroller 250 begins, at step 556, to read instructions from its program data as written via the microcontroller configuration registers 255 and to the execute the instructions it reads. In some embodiments, the instructions may include instructions for performing complicated initialization sequences such as polling operations, operations involving branching, operations involving delays, operations involving repeated accesses to a resource, and the like.

As previously described herein, the PCIe link release may be handed off to the microcontroller 250. In such a case, the microcontroller 250, at step 560, releases the PCIe link holdoff after (or before, as described in further detail below) the microcontroller 250 finishes executing all instructions received from the IFR 240. In one embodiment, the microcontroller 250 may modify the value of a PCIe link release hold-off register 236, thereby causing the release of the PCIe link 113 holdoff and the beginning of PCIe link training. Further, in one embodiment, the microcontroller 250 may be configured to terminate, release the PCIe link 113 holdoff, and display debug output, if the microcontroller 250 encounters an error. Errors may include errors related to the ROM 260, as previously described herein, as well as other errors, such as an error in the setup of a clock of the GPU 210 or an error related to the bus of the GPU 210.

Although the IFR 240 and the microcontroller 250 are shown in FIG. 5 as operating in sequence, in alternative embodiments, the IFR 240 and the microcontroller 250 may operate concurrently to initialize the GPU 210. The microcontroller 250 may begin processing before the last instruction is processed by the IFR 240 in the case where an IFR extended section 319 instruction causes IFR to write a specified value to the microcontroller hand-off register 235 to kick off execution. Such concurrent initialization by the IFR 240 and the microcontroller 250 may speed up the overall boot-up process.

In some embodiments, the microcontroller 250 may be a generic microcontroller. In alternative embodiments, the microcontroller 250 may be a specialized microcontroller. Although described with reference to the microcontroller 250, persons skilled in the art will understand that a different initialization unit can be used in lieu of the microcontroller 250 to perform complicated initialization operations and/or to perform initialization operations at the same time the IFR 240 performs initialization instructions.

In summary, an approach is provided for releasing, upon detection of an error, the holdoff blocking communication across a link coupling, either indirectly or directly, a GPU to a memory bridge. Specifically, an initialization unit of the GPU may detect an error while performing initialization operations. Upon detecting the error, the initialization unit may cause a communication link to be brought up early and debug output to be displayed to a user indicating the error. In some embodiments, errors may include a ROM not being present and errors within the ROM, such as a signature word not matching an expected value, the total size of the ROM not matching an expected value, a checksum not matching an expected value, a parity not matching an expected parity, and/or lengths of instructions in the ROM not matching expected values.

The disclosed approach may further include programming a microcontroller to perform one or more initialization tasks. Initialization tasks may include operations such as polling operations, operations involving branching, operations involving delays, and operations involving repeated accesses to a resource.

Advantageously, in embodiments of the invention, the initialization unit releases the communication link when an error is detected during initialization, thereby allowing debug output to be displayed or otherwise made accessible to the user, who may then debug the error. In contrast, prior art initialization units, which lack a release-on-error feature, oftentimes hang at boot-up without being capable of being debugged when an error occurs. In such situations, the communication link is not available because the holdoff is not released, and the GPU does not appear to the rest of the system.

Further, use of a microcontroller programmed via register addresses that are not individually coded in the ROM permits complex initialization operations that are not predefined operations, reduced ROM sizes, and faster boot-ups. Reduced ROM sizes are advantageous because the ROM footprint is limited. Further, the microcontroller may be programmed to perform complicated initialization operations, which could not be performed by prior art GPU initialization units, including polling operations and operations involving branching, delay, and repeated accesses to a resource. In addition, the microcontroller may be programmed to perform initialization operations that are not predesigned operations conceived before hardware fabrication time. The microcontroller may also have a faster access path to the ROM, allowing it to do basic initializations more quickly than the initialization unit.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The foregoing description and drawings are, accordingly, to be regarded in an illustrative rather than a restrictive sense.

The invention claimed is:

1. A computer-implemented method for performing initialization operations for a graphics processing unit (GPU), the method comprising:
   detecting an error while performing one or more initialization operations;
   releasing a holdoff on a communication link that couples the GPU to a memory bridge; and
   causing debug output to be displayed to a user that indicates the error.

2. The method of claim 1, wherein the communication link comprises a Peripheral Component Interconnect Express (PCIe) link.

3. The method of claim 1, wherein releasing the holdoff comprises terminating a first initialization unit, unless releasing the holdoff on the communication link has been assigned to a second initialization unit.

4. The method of claim 1, wherein the error comprises at least one of a read-only memory (ROM) that includes initialization instructions not being found, a signature of the ROM not matching a predefined signature, a total size of the ROM not matching a predefined size, a checksum value based on a plurality of bits included in the ROM not matching a predefined value, a parity value based on a plurality of bits included in the ROM not matching a predefined value, a size of instructions having been read exceeding the total size of the ROM, or the size of instructions having been read plus a size of any required last instruction or instructions exceeding the total size of the ROM.

5. The method of claim 1, wherein the error comprises at least one of a parity value associated with an instruction read from a ROM that includes initialization instructions not matching a predefined parity for bits composing some or all of the instruction, bits within the instruction that do not match predefined values for those bits, or a number of dwords of the instruction not matching a predefined number.

6. The method of claim 1, further comprising programming, by operation of a first initialization unit, a second initialization unit to perform at least one of the one or more initialization operations, allowing for at least one initialization operation not being a predefined operation conceived before hardware fabrication.

7. The method of claim 6, wherein the second initialization unit comprises a microcontroller, and wherein programming the second initialization unit comprises performing one or more of a read-modify-write operation, repeated write operations to the same address, or write operations to incrementing addresses.

8. The method of claim 7, wherein the one or more initialization operations comprise at least one of a polling operation, a branching operation, repeated access operations to a resource, or a delay operation.

9. The method of claim 8, wherein the first initialization unit and the second initialization unit perform different initialization operations concurrently.

10. An initialization unit of a graphics card configured to:
    detect an error while performing one or more initialization operations;
    release a holdoff on a communication link in response to the detected error; and
    cause debug output to be displayed to a user that indicates the error.

11. The initialization unit of claim 10, wherein the communication link comprises a Peripheral Component Interconnect Express (PCIe) link.

12. The initialization unit of claim 10, wherein releasing the holdoff comprises terminating a first initialization unit, unless releasing the holdoff on the communication link has been assigned to a second initialization unit.

13. The initialization unit of claim 10, wherein the error comprises at least one of a read-only memory (ROM) that includes initialization instructions not being found, a signature of the ROM not matching a predefined signature, a total size of the ROM not matching a predefined size, a checksum value based on a plurality of bits included in the ROM not matching a predefined value, a parity value based on a plurality of bits included in the ROM not matching a predefined value, a size of instructions having been read exceeding the total size of the ROM, or the size of instructions having been read plus a size of any required last instruction or instructions exceeding the total size of the ROM.

14. The initialization unit of claim 10, wherein the error comprises at least one of a parity value associated with an instruction read from a ROM that includes initialization instructions not matching a predefined parity for bits composing some or all of the instruction, bits within the instruction that do not match predefined values for those bits, or a number of dwords of the instruction not matching a predefined number.

15. The initialization unit of claim 10, wherein the initialization unit is further configured to program a second initialization unit to perform at least one of the one or more initialization operations, allowing for at least one initialization operation not being a predefined operation conceived before hardware fabrication.

16. The initialization unit of claim 15, wherein the second initialization unit comprises a microcontroller, and wherein programming the second initialization unit comprises performing one or more of a read-modify-write operation, repeated write operations to the same address, or write operations to incrementing addresses.

17. The initialization unit of claim 16, wherein the one or more initialization operations comprise at least one of a polling operation, a branching operation, repeated access operations to a resource, or a delay operation.

18. The initialization unit of claim 17, wherein the initialization unit is further configured to offload at least one initialization operation to the second initialization unit, and wherein the initialization unit and the second initialization unit perform respective initialization operations concurrently.

19. A computing device comprising:
a graphics processing unit (GPU) having an initialization unit, wherein the initialization unit is configured to:
   detect an error while performing one or more initialization operations;
   release a holdoff on a communication link that couples the GPU to a memory bridge; and
   cause debug output to be displayed to a user that indicates the error.

20. The computing device of claim 19, wherein the initialization unit is further configured to program a microcontroller to perform at least one of the one or more initialization operations, allowing for at least one initialization operation not being a predefined operation conceived before hardware fabrication.

* * * * *